US012107870B2

(12) United States Patent
Behl et al.

(10) Patent No.: US 12,107,870 B2
(45) Date of Patent: Oct. 1, 2024

(54) PROTECTING ACCELERATORS FROM MALICIOUS NETWORK FUNCTIONS

(71) Applicant: INTERNATIONAL BUSINESS MACHINES CORPORATION, Armonk, NY (US)

(72) Inventors: Dushyant K. Behl, Bangalore (IN); Palanivel Andiappan Kodeswaran, Bangalore (IN); Sayandeep Sen, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 687 days.

(21) Appl. No.: 17/304,695

(22) Filed: Jun. 24, 2021

(65) Prior Publication Data

US 2022/0417257 A1 Dec. 29, 2022

(51) Int. Cl.
*H04L 29/06* (2006.01)
*H04L 9/40* (2022.01)

(52) U.S. Cl.
CPC ...... *H04L 63/1416* (2013.01); *H04L 63/1441* (2013.01)

(58) Field of Classification Search
CPC .................. H04L 63/1416; H04L 63/1441
See application file for complete search history.

(56) References Cited

U.S. PATENT DOCUMENTS

| | | | |
|---|---|---|---|
| 9,240,996 B1 * | 1/2016 | Sinnema | H04L 63/1416 |
| 9,329,969 B2 * | 5/2016 | John | G06F 21/55 |
| 9,892,264 B2 | 2/2018 | Merkow | |
| 10,362,040 B2 | 7/2019 | Harris | |
| 2016/0092681 A1 * | 3/2016 | Valles | G06F 21/554 |
| | | | 726/23 |
| 2016/0182559 A1 * | 6/2016 | Francy | H04L 63/1441 |
| | | | 726/1 |
| 2018/0121659 A1 * | 5/2018 | Sawhney | G06F 21/566 |
| 2018/0316730 A1 | 11/2018 | Schaefer | |
| 2021/0173666 A1 * | 6/2021 | Cheng | G06F 9/3877 |
| 2021/0176260 A1 * | 6/2021 | Pan | G06N 5/022 |
| 2022/0358263 A1 * | 11/2022 | Otani | G06F 9/505 |

FOREIGN PATENT DOCUMENTS

| | | |
|---|---|---|
| WO | 2019242659 A1 | 12/2019 |
| WO | 2020220217 A1 | 11/2020 |

OTHER PUBLICATIONS

"About the OVN-Kubernetes default Container Network Interface (CNI) network provider," Printed May 21, 2021, https://docs.openshift.com/container-platform/4.7/networking/ovn_kubernetes_network_provider/about-ovn-kubernetes.html.
(Continued)

*Primary Examiner* — Kambiz Zand
*Assistant Examiner* — Afaq Ali
(74) *Attorney, Agent, or Firm* — Stosch Sabo

(57) ABSTRACT

A method, system, and computer program product to protect accelerators from malicious network functions. One embodiment of the method may comprise categorizing an application runtime into a plurality of operational phases, and enforcing one of a plurality of phase-specific security restrictions at each of the plurality of operational phases. The method may further comprise analyzing the application runtime to automatically generate the plurality of phase-specific security restrictions.

18 Claims, 10 Drawing Sheets

(56) References Cited

OTHER PUBLICATIONS

Adriel Desautels, "Inside the 2020 Ping of Death Vulnerability," Oct. 14, 2020, https://www.netragard.com/inside-the-2020-ping-of-death-vulnerability/.

Alison Diana, "Telcos Become Richer Hacking Targets," Dark Reading, https://www.darkreading.com/cloud/telcos-become-richer-hacking-targets/d/d-id/1337888.

Amir Sadon, Three "Telco Catastrophes" Hackers are Able to Cause, Aug. 8, 2016, https://www.sdxcentral.com/articles/contributed/three-examples-of-telco-catastrophes-hackers-are-able-to-cause/2016/08/.

Bill Hau, Tony Lee, Josh Homan, Threat Research—SYNful Knock—A Cisco router implant—Part I, Sep. 15, 2015, https://www.fireeye.com/blog/threat-research/2015/09/synful_knock_-_acis.html.

Catalin Cimpanu, "Hacker group uses Solaris zero-day to breach corporate networks," Nov. 2, 2020, https://www.zdnet.com/article/hacker-group-uses-solaris-zero-day-to-breach-corporate-networks/.

François Reynaud, François-Xavier Aguessy, Olivier Bettan, Mathieu Bouet, Vania Conan, "Attacks against Network Functions Virtualization and Software-Defined Networking: State-of-the-art," Workshop on Security in Virtualized Networks (Sec-Virtnet 2016), workshop of 2nd IEEE Conference on Network Softwarization (NetSoft 2016), 2016., Jun. 2016, Seoul, South Korea. pp. 471-476, https://hal.archives-ouvertes.fr/hal-01393740/document.

Full Lifecycle Container Security, printed May 21, 2021, https://www.aquasec.com/products/container-security/.

Han, Xueyuan and Pasquier, Thomas and Bates, Adam and Mickens, James and Seltzer, Margo, "Unicorn: Runtime Provenance-Based Detector for Advanced Persistent Threats," ISBN1891562614, Proceedings 2020 Network and Distributed System Security Symposium, Internet Society, published 2020, http://dx.doi.org/10.14722/ndss.2020.24046.

Harpreet Singh, How I hacked into a Telecom Network—Part 4 (Getting Access to CDRs, SS7 applications & VLRs), Jul. 22, 2020, https://infosecwriteups.com/how-i-hacked-into-a-telecom-network-part-4-getting-access-to-cdrs-ss7-applications-vlrs-9a8cf95e2648.

IBM Research Challenges Portal, https://challenges.apps.res.ibm.com/login?redirectTo=%2Fchallenges%2F2385.

Jim Wallace, Arm; Joseph Byrne, "Arm partnership providing the foundation for next generation networks," Mar. 27, 2018, https://community.arm.com/developer/ip-products/processors/b/processors-ip-blog/posts/arm-powered-solutions-the-foundation-for-next-generation-networks.

Loïc Duflot, Yves-Alexis Perez, Guillaume Valadon, Olivier Levillain, "Can you still trust your network card?," https://www.ssi.gouv.fr/uploads/IMG/pdf/csw-trustnetworkcard.pdf.

N-able, "Remote Code Execution Overview," Aug. 29, 2019, https://www.n-able.com/blog/remote-code-execution#:~:text=A%20buffer%20overflow%20vulnerability%20refers,can%20exceed%20the%20allocated%20memory.

Nawaf Alhebaishi, Lingyu Wang and Sushil Jajodia, "Modeling and Mitigating Security Threatsin Network Functions Virtualization-(NFV)," FIP Annual Conference on Data and Applications Security and Privacy, DBSec 2020: Data and Applications Security and Privacy XXXIV, pp. 3-23, https://link.springer.com/chapter/10.1007/978-3-030-49669-2_1.

Paul Chaignon, Diane Adjavon, Kahina Lazri, Jerome Francois, Olivier Festor, "Offloading Security Services to the Cloud Infrastructure," Publication:SecSoN '18: Proceedings of the 2018 Workshop on Security in Softwarized Networks: Prospects and Challenges Aug. 2018 pp. 27-32, https://doi.org/10.1145/3229616.3229624cH.

Pod Security Policies Kubernetes, https://kubernetes.io/docs/concepts/policy/pod-security-policy/, printed May 21, 2021.

Sparsh Mittal, "GPUs: Excellent Performance, But What About Security?" May 31, 2018, https://www.hpcwire.com/2018/05/31/gpus-excellent-performance-but-what-about-security/.

Sparsh Mittal, S.B. Abhinaya, Manish Reddy, Irfan Ali, A Survey of Techniques for Improving Security of GPUS, Submitted Mar. 31, 2018, https://arxiv.org/abs/1804.00114.

Stavros Volos and Kapil Vaswani and Rodrigo Bruno, Graviton: Trusted Execution Environments on GPUs, 13th USENIX—Symposium on Operating Systems Design and Implementation, 2018, pp. 681-696, https://www.usenix.org/conference/osdi18/presentation/volos.

Telecom Sector Threat Landscape Report, BAE Systems, https://www.baesystems.com/en/cybersecurity/feature/telecom-sector-and-cyber-threat-landscape.

Zack Whittaker, "Hackers are stealing years of call records from hacked cell networks," Jun. 24, 2019, https://techcrunch.com/2019/06/24/hackers-cell-networks-call-records-theft/.

Mell et al., "The NIST Definition of Cloud Computing," Recommendations of the National Institute of Standards and Technology, U.S. Department of Commerce, Special Publication 800-145, Sep. 2011, 7 pgs.

\* cited by examiner

```
┌─────────────────────────────────────────────────────────────────┐
│ RUN ACCELERATOR THROUGH ANALYTICS ENGINE OF THE OFFLINE PHASE   │
│ DETECTOR TO CHARACTERIZE OPERATIONAL PHASES.                    │
│                            405                                  │
└─────────────────────────────────────────────────────────────────┘
                                │
                                ▼
┌─────────────────────────────────────────────────────────────────┐
│     LOAD SECURITY MODULE WITH INFORMATION ABOUT THE DETECTED     │
│                           PHASES                                 │
│                            410                                  │
└─────────────────────────────────────────────────────────────────┘
                                │
                                ▼
┌─────────────────────────────────────────────────────────────────┐
│                  BEGIN ACCELERATOR STARTUP PHASE                 │
│                            415                                  │
└─────────────────────────────────────────────────────────────────┘
                                │
                                ▼
┌─────────────────────────────────────────────────────────────────┐
│                INITIALIZE DEVICE. TRIGGER PHASE UPDATE           │
│                            420                                  │
└─────────────────────────────────────────────────────────────────┘
                                │
                                ▼
┌─────────────────────────────────────────────────────────────────┐
│                ENABLE SECURITY PROFILE FOR FIRST PHASE           │
│                            425                                  │
└─────────────────────────────────────────────────────────────────┘
                                │
                                ▼
┌─────────────────────────────────────────────────────────────────┐
│                ENABLE SECURITY PROFILE FOR SECOND PHASE          │
│                            430                                  │
└─────────────────────────────────────────────────────────────────┘
                                │
                                ▼
┌─────────────────────────────────────────────────────────────────┐
│                 SETUP DEVICE. TRIGGER PHASE UPDATE               │
│                            435                                  │
└─────────────────────────────────────────────────────────────────┘
                                │
                                ▼
┌─────────────────────────────────────────────────────────────────┐
│               SETUP CONTROL PATH. TRIGGER PHASE UPDATE           │
│                            440                                  │
└─────────────────────────────────────────────────────────────────┘
                                │
                                ▼
┌─────────────────────────────────────────────────────────────────┐
│                ENABLE SECURITY PROFILE FOR THIRD PHASE           │
│                            445                                  │
└─────────────────────────────────────────────────────────────────┘
                                │
                                ▼
┌─────────────────────────────────────────────────────────────────┐
│             BEGIN FAST PATH OPERATION. TRIGGER PHASE UPDATE      │
│                            450                                  │
└─────────────────────────────────────────────────────────────────┘
                                │
                                ▼
┌─────────────────────────────────────────────────────────────────┐
│                ENABLE SECURITY PROFILE FOR FOURTH PHASE          │
│                            455                                  │
└─────────────────────────────────────────────────────────────────┘
```

PROTECTING ACCELERATORS FROM MALICIOUS NETWORK FUNCTIONS

BACKGROUND

The present disclosure relates to computer security, and more specifically, to protecting network application accelerators from malicious network functions using dynamic application phase-based security enforcement.

The development of the EDVAC system in 1948 is often cited as the beginning of the computer era. Since that time, computer systems have evolved into extremely complicated devices. Today's computer systems typically include a combination of sophisticated hardware and software components, application programs, operating systems, processors, buses, memory, input/output devices, and so on. As advances in semiconductor processing and computer architecture push performance higher and higher, even more advanced computer software has evolved to take advantage of the higher performance of those capabilities, resulting in computer systems today that are much more powerful than just a few years ago.

Today's computer systems are often designed to communicate with each other over a network, such as a local area network or the Internet. These network function(s) may be implemented using special purpose network hardware, such as an input/output processor (IOP). These network function (s) may also be virtualized, i.e., implemented in whole or in part using software that performs the operations of the network hardware. These virtual network functions, in turn, may be managed using virtual machines, such as a Virtual Network Function (VNF) and a Containerized Network Function (CNF).

SUMMARY

According to embodiments of the present disclosure, a method to protect accelerators from malicious network functions, comprising categorizing an application runtime into a plurality of operational phases, and enforcing one of a plurality of phase-specific security restrictions at each of the plurality of operational phases. The method may further comprise analyzing the application runtime to automatically generate the plurality of phase-specific security restrictions.

According to embodiments of the present disclosure, a computer program product for protecting accelerators from malicious network functions comprising a computer readable storage medium having program instructions embodied therewith. The program instructions may be executable by a processor to cause the processor to analyze an application runtime to automatically generate the plurality of phase-specific security restrictions, and enforce one of a plurality of phase-specific security restrictions at each of the plurality of operational phases. The analyzing may comprise initializing the application runtime in an offline environment, and at each of a plurality of time steps, measuring a resource utilization by the application runtime, and recording system calls made by the application runtime. The analyzing may further comprise using the measured resource utilization and the recorded system calls to identify a plurality of distinct operational phases for the application runtime, wherein identifying one of the plurality of distinct operational phases comprises determining whether a cosine distance between is greater than a predetermined threshold, and calculate a signature for each of the plurality of distinct operational phases, build a model of the resources that the application runtime is allowed to access during each of the plurality of distinct operational phases, and generate a set of security restrictions for each of the plurality of distinct operational phases using the model. The enforcing may comprise using the signatures to automatically detect a first of the plurality of distinct operational phases for the application runtime, enforcing a first of the plurality of phase-specific security restrictions during the first of the plurality of distinct operational phases, using the signatures to automatically detect a second of the plurality of distinct operational phases for the application runtime, and selecting a second of the plurality of phase-specific security restrictions during the first of the plurality of distinct operational phases, wherein the first and the second of the plurality of phase-specific security restrictions are different.

According to embodiments of the present disclosure, a system for protecting accelerators from malicious network functions, comprising a runtime phase detector configured to categorize an application runtime executing on an accelerator into a plurality of operational phases, and a dynamic security engine communicatively coupled to the accelerator, wherein dynamic security engine is configured to enforce one of a plurality of phase-specific security restrictions at each of the plurality of operational phases. The system may further comprise an offline rules generator configured to analyze the application runtime to automatically generate the plurality of phase-specific security restrictions.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 4 is a flow chart illustrating one example setup method for a network function (NF) accelerator, consistent with some embodiments.

Figure 1A:
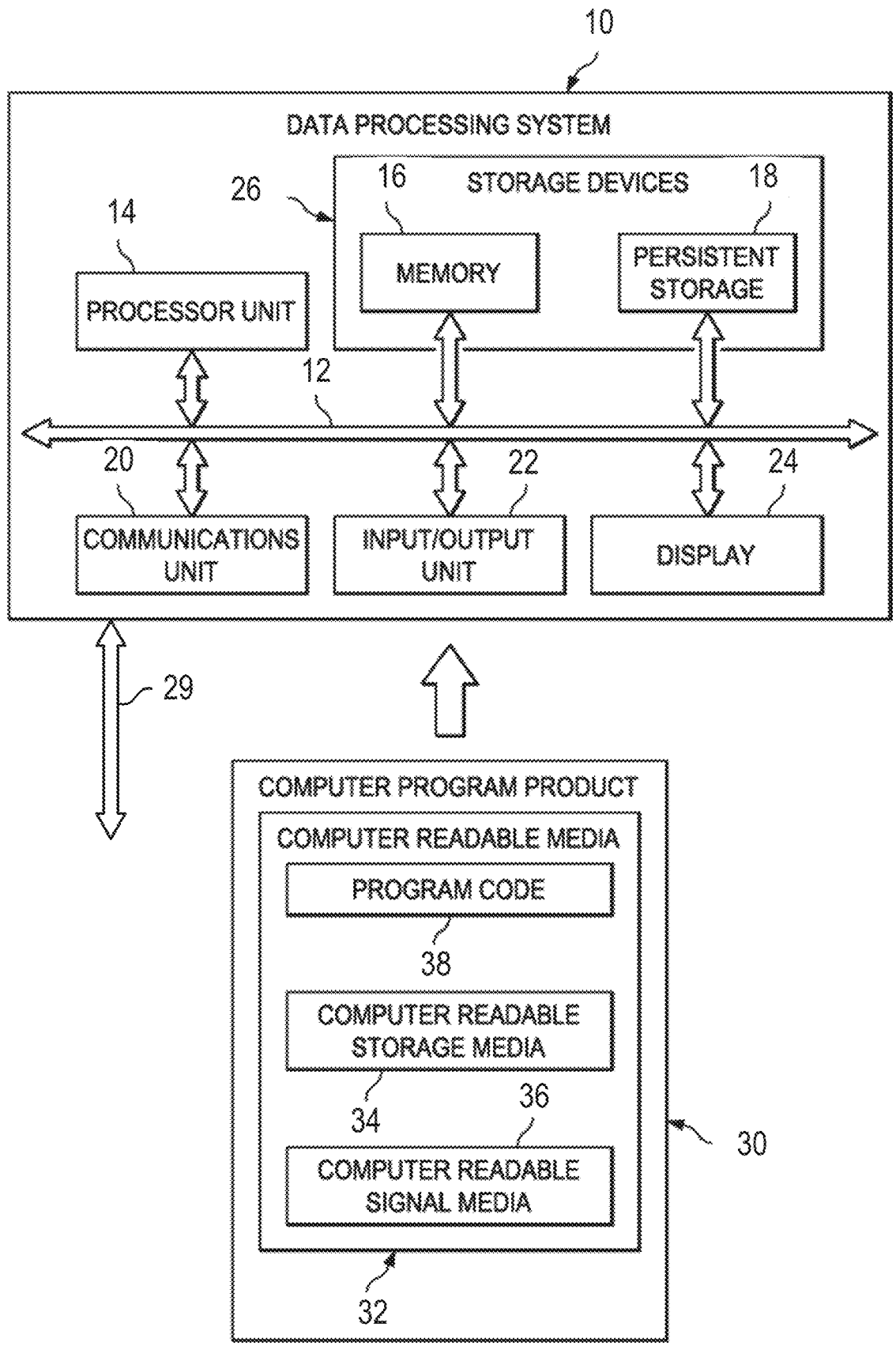
FIG. 1A is a block diagram of a data processing system (DPS) according to one or more embodiments disclosed herein.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate to computer security; more particular aspects relate to protecting network application accelerators from malicious network functions using dynamic application phase-based security enforcement. While the present disclosure is not necessarily limited to such applications, various aspects of the disclosure may be appreciated through a discussion of various examples using this context.

Today, many telecommunication (telco) operators are enabling network functions as virtual machines, such as VNFs (Virtual Network Functions) and CNFs (Containerized Network Functions). Similarly, many data centers have begun to use programmable smart switches. These switches may be built using hardware running processors optimized for low power usage, high throughput, and low latency. These switches may support programmable offload of network, including datapath, functions. Additionally, in some cases, these network functions can share a hardware device using the Data Plane Development Kit (DPDK) framework and/or the single root I/O virtualization (SR-IOV) interface standard.

While these virtual network functions may be more scalable, agile, and higher performing compared to traditional, hardware-based functions, they may also expose telco and data center operators to potential attacks by increasing their respective software attack surfaces. For example, the increasing usage of smart network devices and code offloading may put SmartNICs at risk of much stronger and stealthier attacks. For example, the increased attack surface due to network function and/or code offloading to smart network devices puts the functions at risk of being compromised and controlled by malicious actors. Worse, if an attacker can execute arbitrary code on a virtual network device, that attacker can do virtually anything in the broader system. For example, an attacker may be able to simply remove the vulnerable code from the firewall stack to avoid detected by introspection software within milliseconds. Then, the resulting rogue code can remain on the device undetected, possibly until the next reboot of the system.

Accordingly, some embodiments of the disclosure include a system and method to protect smart hardware and/or accelerators from malicious network functions by categorizing the application runtimes into specific phases, and then enforcing phase-based security restrictions. Some embodiments may include a method for categorizing network function runtime into specific phases and detecting a current application phase. Some embodiments may include a method for learning distributed phase-based security rules for restricting application actions on accelerators. Some embodiments may include a method for enforcing phase-based security rules into smart hardware. In this way, some embodiments may protect network devices, and other accelerators like graphics processing units, from malicious and/or rogue network functions.

Data Processing System

FIG. 1A is a block diagram of an example data processing system (DPS) according to one or more embodiments. In this illustrative example, the DPS 10 may include communications bus 12, which may provide communications between a processor unit 14, a memory 16, persistent storage 18, a communications unit 20, an Input/Output (I/O) unit 22, and a display 24.

The processor unit 14 serves to execute instructions for software that may be loaded into the memory 16. The processor unit 14 may be a number of processors, a multi-core processor, or some other type of processor, depending on the particular implementation. A number, as used herein with reference to an item, means one or more items. Further, the processor unit 14 may be implemented using a number of heterogeneous processor systems in which a main processor is present with secondary processors on a single chip. As another illustrative example, the processor unit 14 may be a symmetric multi-processor system containing multiple processors of the same type.

The memory 16 and persistent storage 18 are examples of storage devices 26. A storage device may be any piece of hardware that is capable of storing information, such as, for example without limitation, data, program code in functional form, and/or other suitable information either on a temporary basis and/or a permanent basis. The memory 16, in these examples, may be, for example, a random access memory or any other suitable volatile or non-volatile storage device. The persistent storage 18 may take various forms depending on the particular implementation.

For example, the persistent storage 18 may contain one or more components or devices. For example, the persistent storage 18 may be a hard drive, a flash memory, a rewritable optical disk, a rewritable magnetic tape, or some combination of the above. The media used by the persistent storage 18 also may be removable. For example, a removable hard drive may be used for the persistent storage 18.

The communications unit 20 in these examples may provide for communications with other DPSs or devices. In these examples, the communications unit 20 is a network interface card. The communications unit 20 may provide communications through the use of either or both physical and wireless communications links.

The input/output unit 22 may allow for input and output of data with other devices that may be connected to the DPS 10. For example, the input/output unit 22 may provide a connection for user input through a keyboard, a mouse, and/or some other suitable input device. Further, the input/output unit 22 may send output to a printer. The display 24 may provide a mechanism to display information to a user.

Instructions for the operating system, applications and/or programs may be located in the storage devices 26, which are in communication with the processor unit 14 through the communications bus 12. In these illustrative examples, the instructions are in a functional form on the persistent storage 18. These instructions may be loaded into the memory 16 for execution by the processor unit 14. The processes of the different embodiments may be performed by the processor unit 14 using computer implemented instructions, which may be located in a memory, such as the memory 16. These instructions are referred to as program code 38 (described below) computer usable program code, or computer readable program code that may be read and executed by a processor in the processor unit 14. The program code in the different embodiments may be embodied on different physical or tangible computer readable media, such as the memory 16 or the persistent storage 18.

The DPS 10 may further comprise an interface for a network 29. The interface may include hardware, drivers, software, and the like to allow communications over wired and wireless networks 29 and may implement any number of communication protocols, including those, for example, at various levels of the Open Systems Interconnection (OSI) seven layer model.

FIG. 1A further illustrates a computer program product 30 that may contain the program code 38. The program code 38 may be located in a functional form on the computer readable media 32 that is selectively removable and may be loaded onto or transferred to the DPS 10 for execution by the processor unit 14. The program code 38 and computer readable media 32 may form a computer program product 30 in these examples. In one example, the computer readable media 32 may be computer readable storage media 34 or computer readable signal media 36. Computer readable storage media 34 may include, for example, an optical or magnetic disk that is inserted or placed into a drive or other device that is part of the persistent storage 18 for transfer onto a storage device, such as a hard drive, that is part of the persistent storage 18. The computer readable storage media 34 also may take the form of a persistent storage, such as a hard drive, a thumb drive, or a flash memory, that is connected to the DPS 10. In some instances, the computer readable storage media 34 may not be removable from the DPS 10.

Alternatively, the program code 38 may be transferred to the DPS 10 using the computer readable signal media 36. The computer readable signal media 36 may be, for example, a propagated data signal containing the program code 38. For example, the computer readable signal media 36 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 38 may be downloaded over a network to the persistent storage 18 from another device or DPS through the computer readable signal media 36 for use within the DPS 10. For instance, program code stored in a computer readable storage medium in a server DPS may be downloaded over a network from the server to the DPS 10. The DPS providing the program code 38 may be a server computer, a client computer, or some other device capable of storing and transmitting the program code 38.

The different components illustrated for the DPS 10 are not meant to provide architectural limitations to the manner in which different embodiments may be implemented. The different illustrative embodiments may be implemented in a DPS including components in addition to or in place of those illustrated for the DPS 10.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1B:
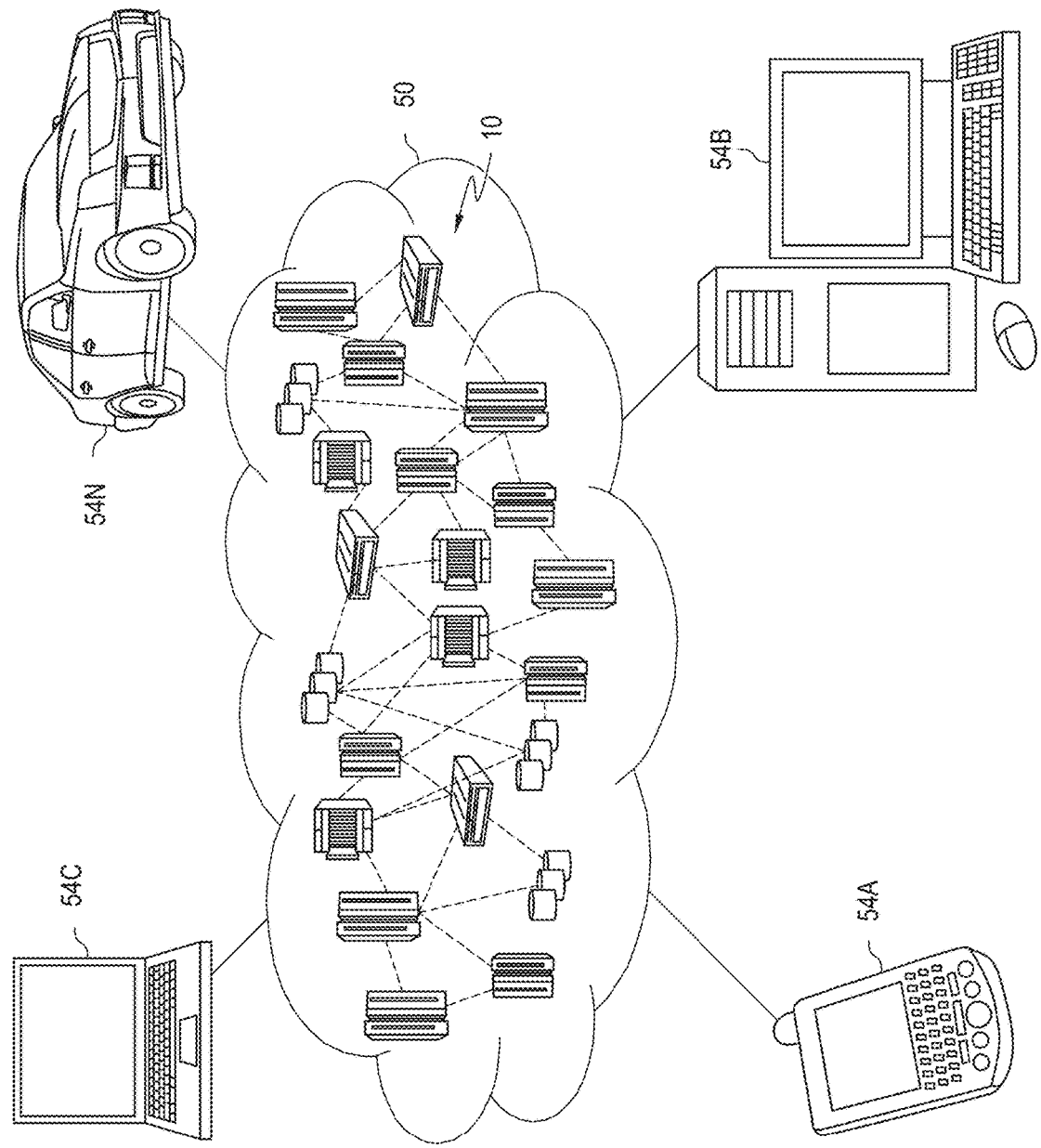
FIG. 1B is a pictorial diagram that depicts a cloud computing environment according to an embodiment disclosed herein.

Referring now to FIG. 1B, illustrative cloud computing environment 52 is depicted. As shown, cloud computing environment 52 includes one or more cloud computing nodes 50 with which local computing devices used by cloud consumers, such as, for example, personal digital assistant (PDA) or cellular telephone 54A, desktop computer 54B, laptop computer 54C, and/or automobile computer system 54N may communicate. Nodes 50 may communicate with one another. They may be grouped (not shown) physically or virtually, in one or more networks, such as Private, Community, Public, or Hybrid clouds as described hereinabove, or a combination thereof. This allows cloud computing environment 52 to offer infrastructure, platforms and/or software as services for which a cloud consumer does not need to maintain resources on a local computing device. It is understood that the types of computing devices 54A-N shown in FIG. 1B are intended to be illustrative only and that computing nodes 50 and cloud computing environment 52 can communicate with any type of computerized device over any type of network and/or network addressable connection (e.g., using a web browser).

Figure 1C:
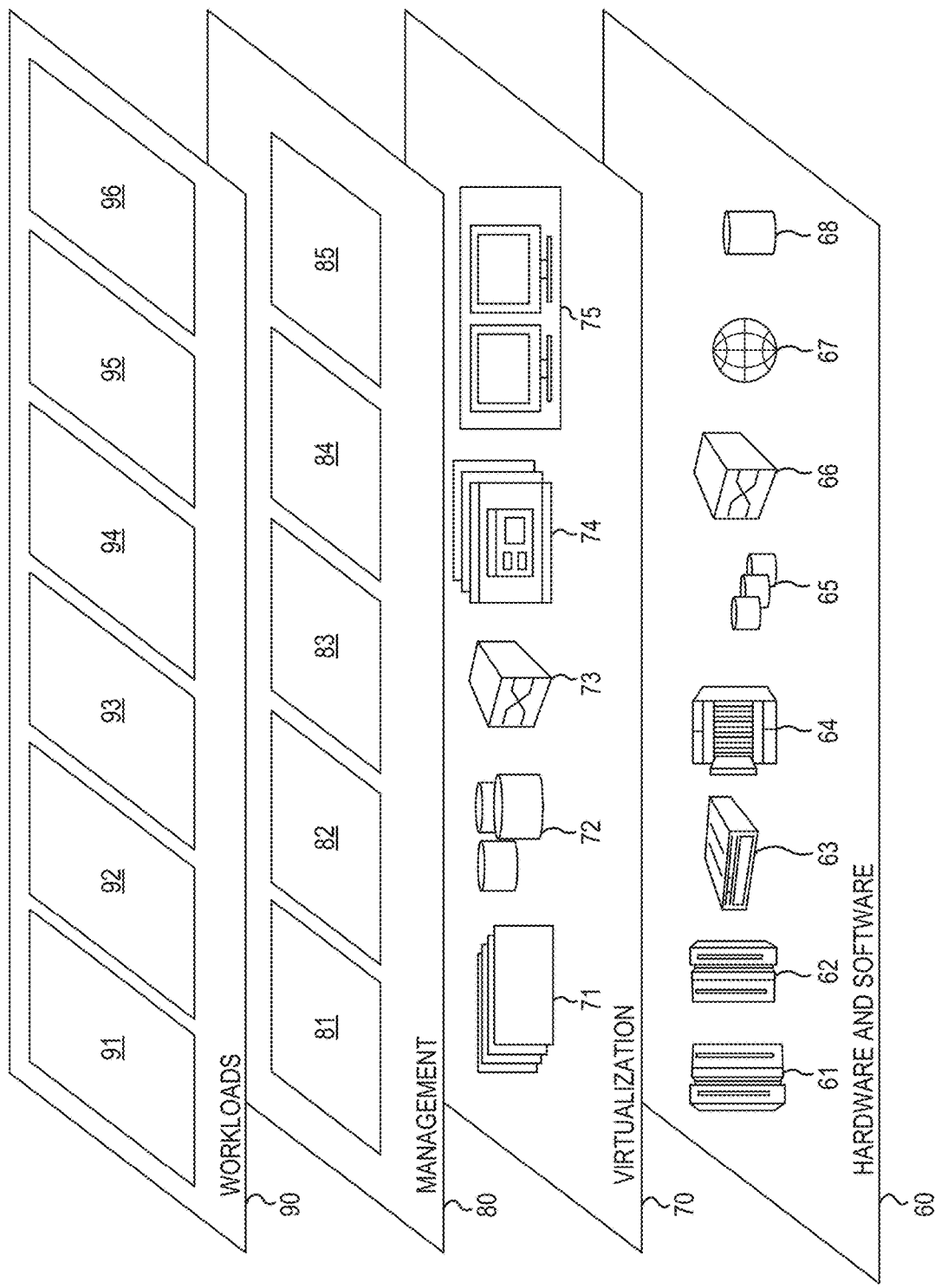
FIG. 1C is a pictorial diagram that depicts abstraction model layers according to an embodiment disclosed herein.

Referring now to FIG. 1C, a set of functional abstraction layers provided by cloud computing environment 52 (FIG. 1B) is shown. It should be understood in advance that the components, layers, and functions shown in FIG. 1C are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application processing elements 96.

Any of the nodes 50 in the computing environment 52, as well as the computing devices 54A-N, may be a DPS 10.

Computer Readable Media

The present invention may be a system, a method, and/or a computer readable media at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention are presented for purposes of illustration, but are not intended to be exhaustive or limited to the embodiments disclosed. Many modifications and variations will be apparent to those of ordinary skill in the art without departing from the scope and spirit of the described embodiments. The terminology used herein has been chosen to best explain the principles of the embodiments, the practical application or technical improvement over technologies found in the marketplace, or to enable others of ordinary skill in the art to understand the embodiments disclosed herein.

System Architecture

Figure 2A:
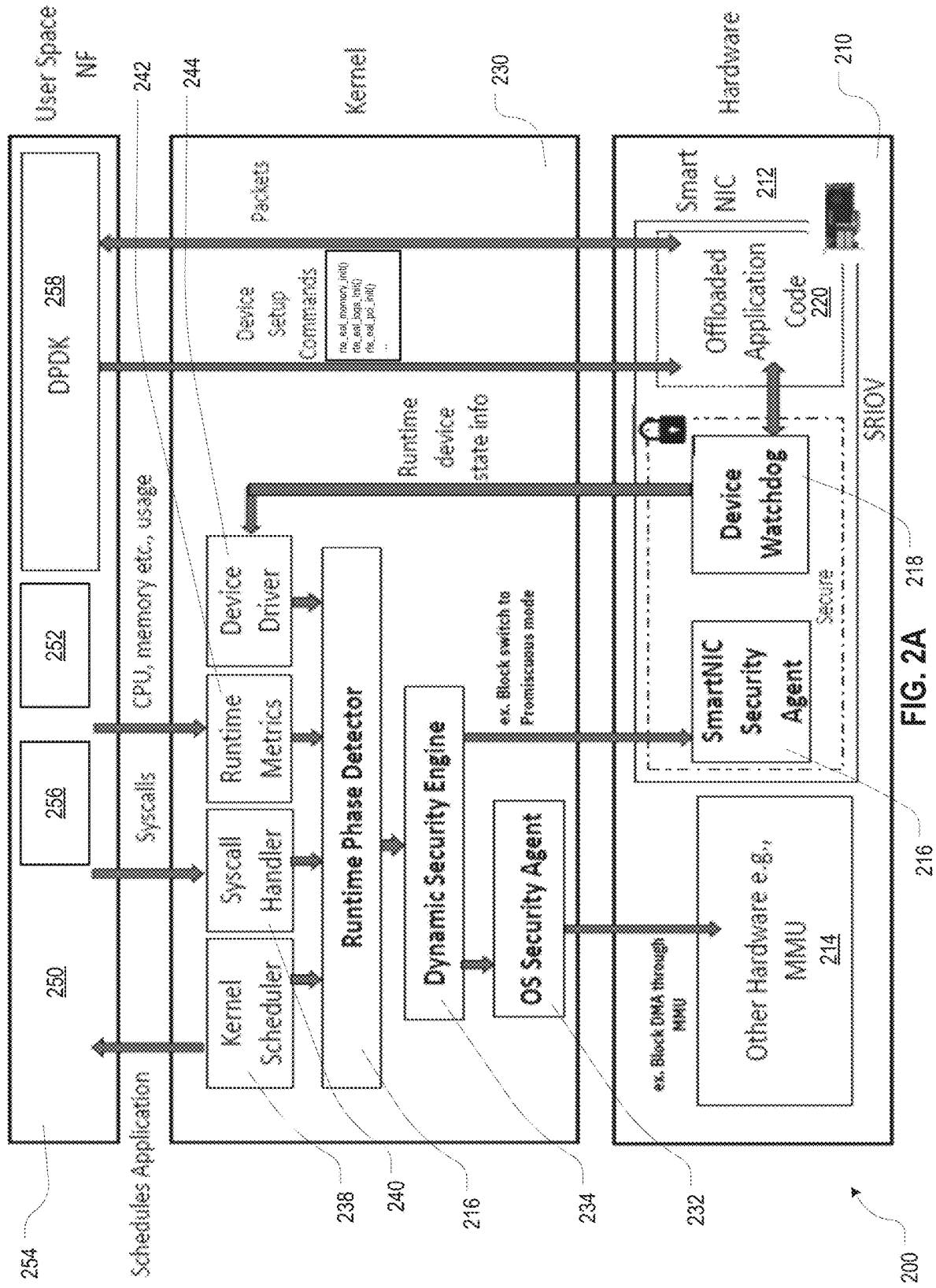
FIG. 2A is a system diagram of one embodiment of an example network function (NF) accelerator, consistent with some embodiments.

FIG. 2A is a system diagram of one embodiment of an example network function (NF) accelerator 200, consistent with some embodiments. The accelerator 200 in this embodiment may be implemented as software executing in a DPS 10, and may comprise a hardware layer 210, a kernel layer 230, and a user space 254 containing a NF application 250, an offline phase detector/categorizer 252, and an offline rules generator 256. The hardware layer 210 in this embodiment may comprise a SmartNIC 212 and a plurality of other hardware 214, such as a memory management unit (MMU). The SmartNIC 212, in turn, may comprise a SmartNIC security agent 216, a device watchdog 218, and an offloaded application 220. The kernel layer 230 may comprise an OS security agent 232, a dynamic security engine module 234, and a runtime phase detector 236. The kernel layer 230 may also comprise a kernel scheduler 238, a syscall handler 240, a runtime metrics data store 242, and a plurality of device drivers 244, one of which may be designed to communicate data and commands with the SmartNIC 212. The network function 250 may contain one or more applications, such as a Data Plane Development Kit (DPDK) 258, which may exchange device setup commands (e.g., rte_eal_memory_init( ). rte_eal_logs_init( ), rte_eal_pci_init( ), etc.) and packets with the offloaded application 220.

In operation, the SmartNIC security agent 216 in this example may be a module running in a privileged environment in the SmartNIC 212 (e.g., a physical function (PF) in SR-IOV Devices) and may be able to allow/restrict access to any hardware resources by the offloaded application code 220 in the SmartNIC 212. The SmartNIC security agent 216 may receive restrictions from the dynamic security engine module 234 and implement them on the SmartNIC 212 using, e.g., hardware access restrictions implemented for a virtual function. Wherever needed, the SmartNIC security agent 216 may be configured to convert certain restrictions e.g., <Promiscuous Mode: Disabled> to a device command, which may clear a promiscuous mode register and disable application access to it.

The OS security agent 232 may run one or more kernel modules (not shown) to implement security restrictions, such as DMA protections, that are desired on other hardware 214 and/or the host 200. The OS security agent 232 may also receive rules from the dynamic security engine module 234 and may convert them to commands that are executed on the hardware/calls to other kernel modules, e.g., an MMU manager.

Figure 2B:
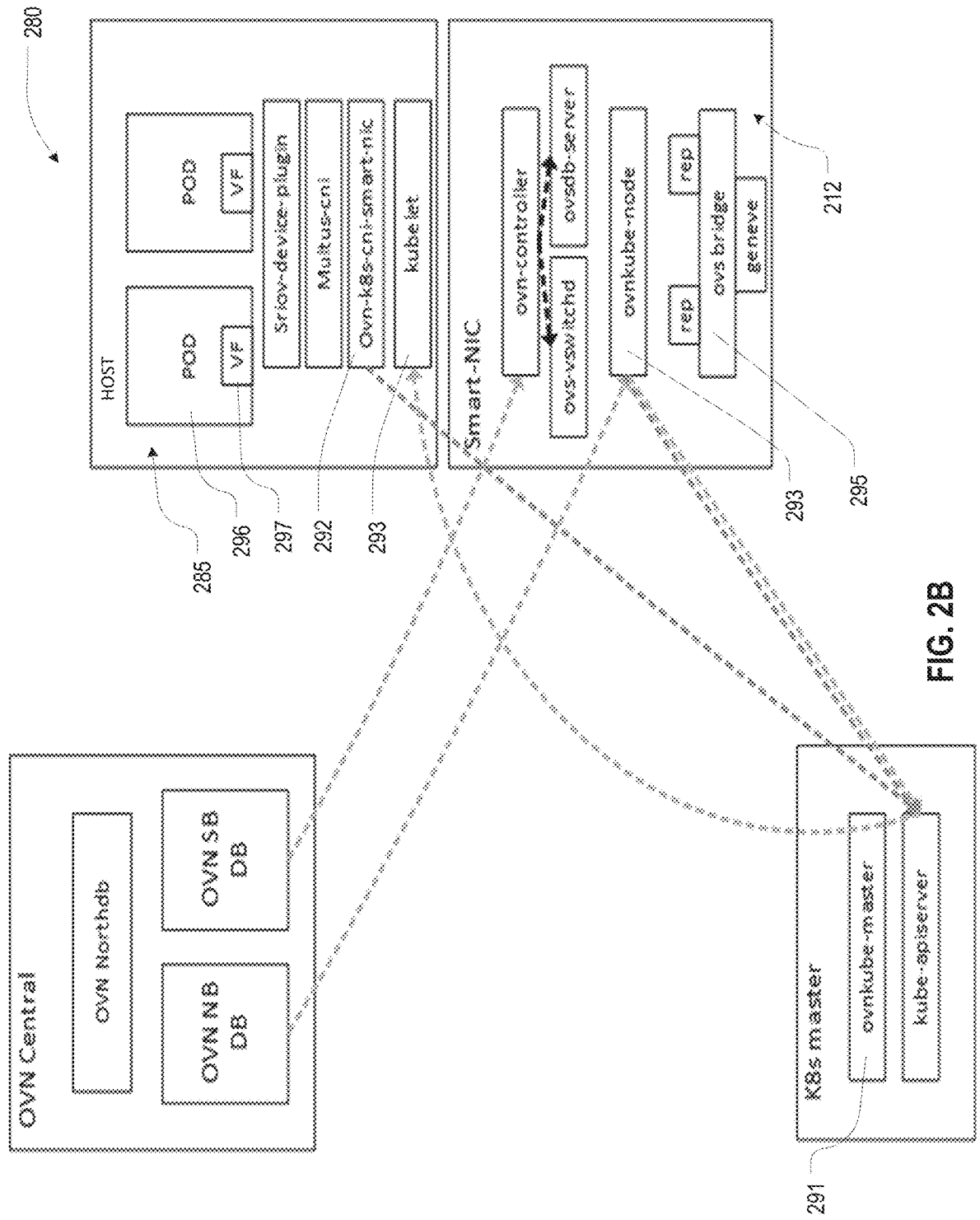
FIG. 2B is a system diagram of an example network accelerator, which divides network functions between a host and a SmartNIC, consistent with some embodiments.

FIG. 2B is a system diagram of an example network accelerator 280, which divides network functions between a host 285 and a SmartNIC 290, consistent with some embodiments. This example network accelerator 280 is described with reference to an OpenShift Container Platform cluster, which uses a virtualized network for pod and service networks. This embodiment may also use Open Virtual Network (OVN) virtualization to manage network traffic flows. The OVN-Kubernetes Container Network Interface (CNI) plug-in, in turn, is a network provider for the cluster network.

With respect to the host 285, a system administrator may first create a pod spec with a single root I/O virtualization (SR-IOV) resource name. The accelerator 280 may respond by allocating SR-IOV device allocation by kubelet. The kubelet, in turn, may allocate virtual functions (VFs) from the available VF(s) e.g., by a call to SR-IOV device plugin. The CNI command CmdAdd( ) command may be invoked by the kubelet, and then the ovn-k8s-smart-nic-cni component may extract the physical function (PF) and virtual function (VF) indexes of the assigned VF device 297 for the pod 296.

With respect to the SmartNIC 290, a Ovn-kubernetes-master 291 (i.e., an ovn-kubernetes-node that runs on the SmartNIC 212) may begin registering on-pod update events. In response, the ovn-k8s-smart-nic-cni 292 component may update pod annotation e.g., with:

k8s.ovn.org/smartnic.connection-details={"pf": "<pci address>", "vf": <vf index>}

The ovn-k8s-smart-nic-cni component may then start to poll on-pod annotations. The Ovn-kubernetes-node 294 on the SmartNIC 290 may then receive a pod create/update event with the following pod annotation:

k8s.ovn.org/smartnic.connection-details={"pf": "<pci address>", "vf": <vf index>}

The Ovn-kubernetes-node on the SmartNIC 210 may then update the pod's annotations with:

k8s.ovn.org/smartnic.connection-status={"status": "Ready", "reason": " "}

The ovn-k8s-smart-nic-cni (during periodic poll) may detect:

k8s.ovn.org/smartnic.connection-status={"status": "Ready", "reason": " "} in the pod's annotations, which may mean that the VF's representor was successfully plugged to the OVS bridge 295. The ovn-k8s-smart-nic-cni component may proceed with VF configurations e.g., move the VF to the pod and add IP address.

Accelerator Runtime Operation

Figure 3:
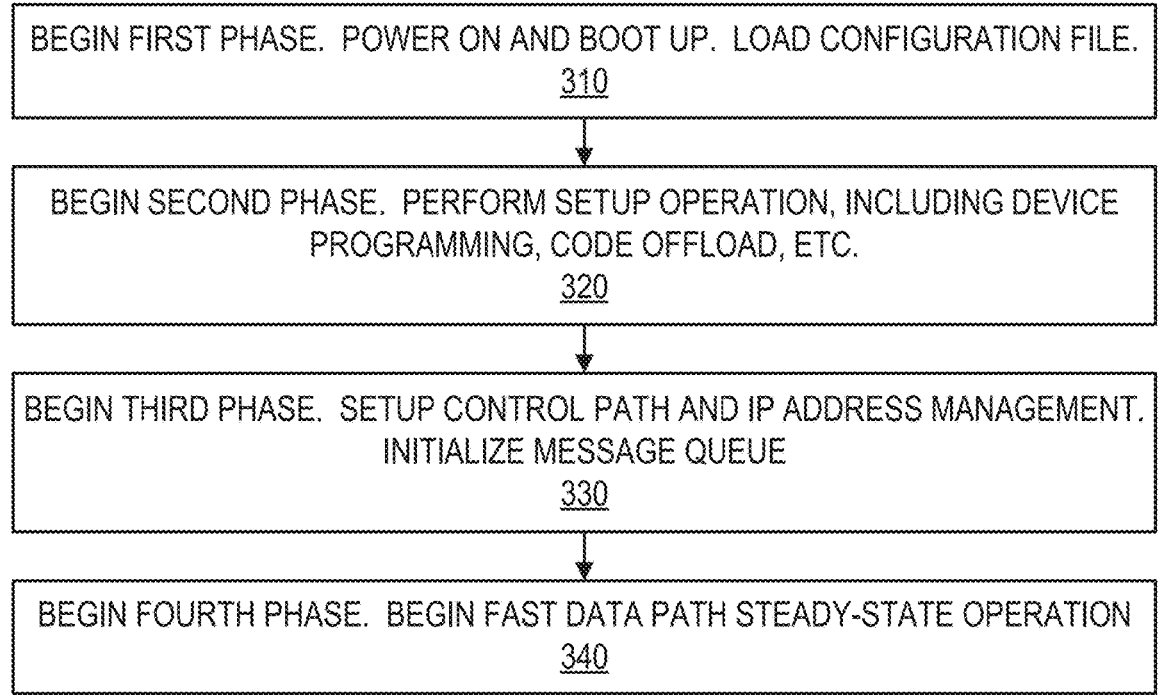
FIG. 3 is a flow chart illustrating one example method flow of operating an accelerator through multiple execution phases, consistent with some embodiments.

FIG. 3 is a flow chart illustrating one example method flow 300 of operating an accelerator 200 through multiple execution phases, consistent with some embodiments. In this embodiment, network functions (NFs) may be created to serve single purpose and have certain runtime behavior, and may use a run-to-completion model. NF execution during runtime may be divided into separate phases during which an NF performs certain actions and needs appropriate privileges. Some embodiments may characterize NF runtime into phases, and then dynamically change NF permissions on the accelerator device based on the phase it is executing in. This allows these embodiments to apply principle of least privilege dynamically and restrict any malicious/Rogue NF to gain access of the device, and is in contrast to prior art approaches that give each NF the union of all the privileges it will need to execute in all the phases.

At operation 310 in example flow 300, a first phase may begin. In this first phase, the NF may power on and boot up. This first phase may include loading a configuration file containing one or more configurations for the NF. At operation 320, the first phase may end, and a second phase may begin. During this second phase, the accelerator 200 may perform a setup operation. This setup operation may include device programming, code offload, etc. At operation 330, the second phase may end, and a third phase may begin. In the third phase, a control path may be setup, IP Address Management (IPAM) may be setup, and the message queue may be initialized. At operation 340, the third phase may end, and a fourth phase may begin. In this fourth phase, the accelerator 200 may begin its fast data path steady-state operation. This may include receiving and sending packets to and from other devices in the cloud computing environment 52.

Accelerator Runtime Setup

FIG. 4 is a flow chart illustrating one example setup method 400 for a network function (NF) accelerator 200, consistent with some embodiments. This embodiment may run two privileged modules on the accelerator 200 (e.g., in the PF, which controls the virtual functions in SR-IOV mode) in a secure way, such as in the secure zone on a RISC CPU core of a SmartNIC. A device watchdog module may collect information about device runtime status and commands issued by NF accelerator 200 to the VFs. A security agent module may modify device settings (e.g., VF settings) based on the rules issued by the dynamic security engine module running in the kernel.

At operation 405, when the NF accelerator 200 is installed, the NF accelerator 200 may be run through an analytics engine of the offline phase detector 252 to characterize its different operational phases. Next, before the NF accelerator 200 is started, a security module running on the smart device may be loaded with information about the detected phases of the NF accelerator 200 at operation 410.

The NF accelerator 200 in this embodiment may start in a startup phase at operation 415. In this startup phase, the NF accelerator 200 may not be allowed device access by a security module running on the SmartNIC. After the NF accelerator 200 performs its startup, the NF accelerator 200 may make a call to the device for initialization, which may trigger a phase update at operation 420. In response, the security module may enable the security profile specific for that phase, e.g., tell the kernel module to disable NF accelerator 200 access to file system, limit syscalls, etc., at operation 425.

After device initialization is done, a second phase change may be triggered at operation 430. In response, the security module may enable the security profile for the second phase at operation 435, e.g., may disable further device register changes and may allow the NF accelerator 200 to only update the control plan registers (e.g., queue size, MTU, MSS etc.). Next, the control path may be setup at operation 440, which may trigger a third phase change. In response, the security module may enable the security profile for the third phase at operation 445.

Once the control path is done, the NF accelerator 200 may enter data fast path phase at operation 450. In response, the security module may enable the security profile for the fourth phase at operation 455. This fourth phase may be a steady state phase with the least privileges active (i.e., the most restricted phase). Once in the fast path, the NF accelerator 200 cannot change its device configuration/security mode, in some embodiments.

Offline Phase Detector

Figure 5:
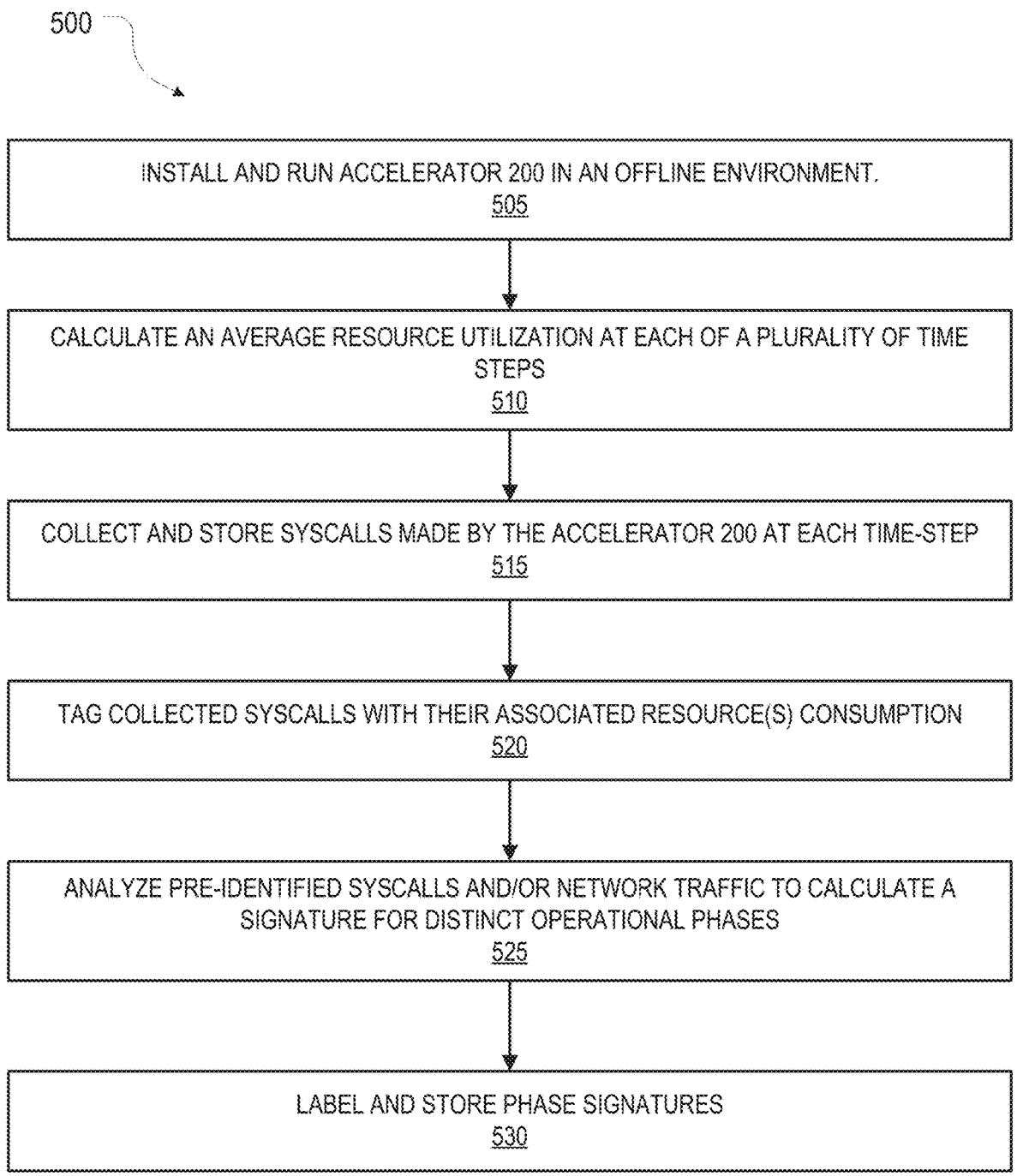
FIG. 5 is a flow chart illustrating one method for categorizing a runtime of a NF accelerator into specific phases by the offline phase detector, consistent with some embodiments.

FIG. 5 is a flow chart illustrating one method 500 for categorizing a runtime of a NF accelerator 200 into specific phases by the offline phase detector 252, consistent with some embodiments. At operation 505, the NF accelerator 200 may be installed in an offline environment and run. At each of a plurality of time steps, an average resource utilization may be calculated on the host, e.g., <CPU, memory, Disk, Network, PMC> at operation 510. In some embodiments, this calculation may be done on a per-application basis. The method may continue at operation 515, where the syscalls made by the NF accelerator 200 at each time-step may be collected and stored in the runtime metrics data store 242. One suitable method to collect these syscalls is to probe using the extended Berkeley Packet Filter (eBPF) program.

At operation 520, the collected syscalls may be tagged with their associated resource(s) consumption. Suitable collected resources include, without limitation, percent of maximum CPU, disk reads per second, disk writes per second, inbound network traffic rate, outbound traffic flow rate, voltage and/or current use as measured by one or more power management controllers (PMCs). In some cases, certain pre-identified syscalls (e.g., a request IP address lease) and/or network traffic to specific, pre-identified nodes (e.g., a service node of the cloud computing environment 52) may also be collected and tagged at operation 520.

These pre-identified syscalls and/or network traffic may be analyzed using cluster analysis to calculate a signature for distinct operational phases and/or to identify a signature for the transitions between the distinct operational phases at operation 525. For example, each operational phase ($P_i$) may be characterized by its average resource usage ("V") across multiple resources at time "t" e.g., $V^{P_i}_t$=<<syscalls>, cpu, memory, disk, network, PMC1, PMC2, . . . PMCn>

Some embodiments may detect a phase change from $P_i$ to $P_{i+1}$ when the cosine distance between $V_t$ and $V_{t+1}$ is greater than a predetermined threshold. Other embodiments, however, may use different metrics to identify the phase changes. At operation 530, the phase change(s) and/or phase change transitions signatures labeled and stored in the runtime metrics data store 242.

Offline Rules Generator

Figure 6:
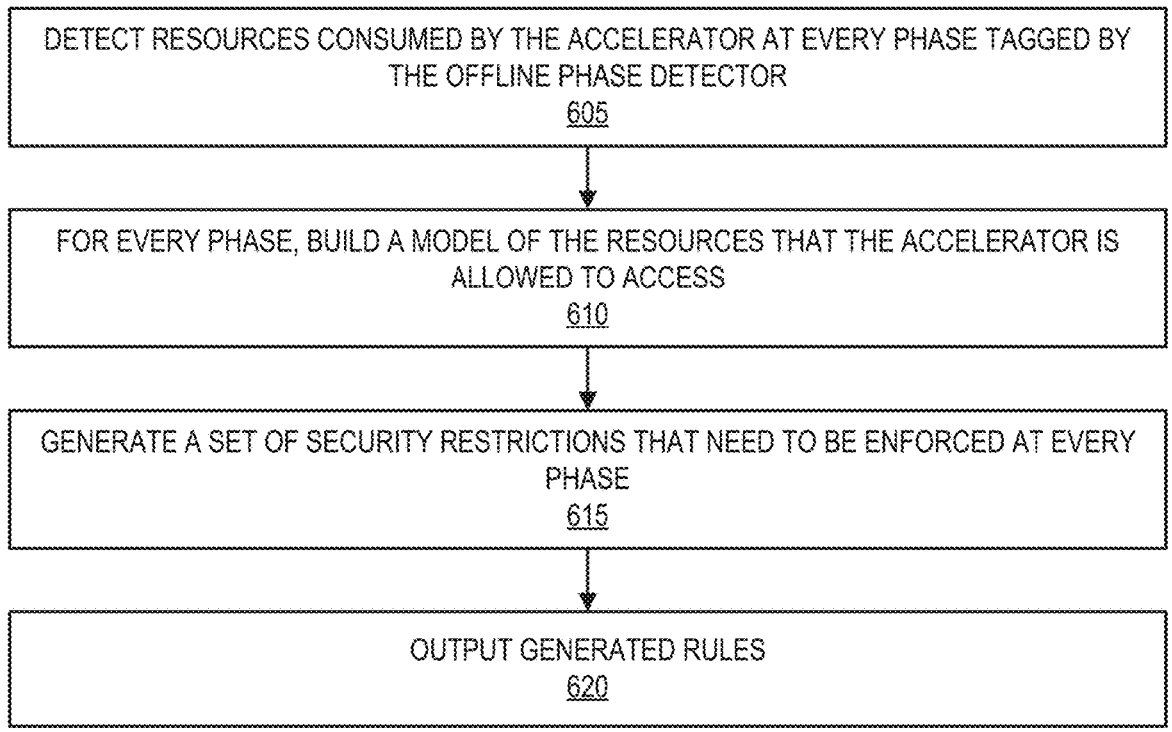
FIG. 6 is a flow chart illustrating one method for learning phase-based security restrictions for the NF accelerator by the offline rules generator, consistent with some embodiments.

FIG. 6 is a flow chart illustrating one method 600 for learning phase-based security restrictions for the NF accelerator 200 by the offline rules generator 256, consistent with some embodiments. At operation 605, at every phase tagged by the offline phase detector 252, the resources consumed by the NF accelerator 200 on the device may be detected by the offline rules generator 256. These resources may include the resources on the SmartNIC that an NF can request range from, e.g., RX/TX queues, MAC MUX table, control plane registers (e.g. setting up promiscuous mode), generic CPU cores, cache strips, encryption/decryption coprocessors, specific protocol (RDMD/Infiniband) FPGA processors, etc. At operation 610, for every phase, a model of the resources that the NF accelerator 200 is allowed to access on the DPS 10 and/or the cloud computing environment 52 may be built by the offline rules generator 256. Next, at operation 615, a set of security restrictions that need to be enforced for every phase may be generated by the offline rules generator 256. The rules generator may output these out rules at operation 620 in the form of:

{phase: [cpu,memory,queues,cache,enc1,enc2 . . . rdma0, infiniband0]} which may represent the allowed access by each application/offloaded core to specific resources (e.g., CPU, memory, network hardware, etc.) in a specific "phase." For example, some embodiments will allow access to encryption/decryption coprocessors, or access to a specific protocol FPGA processors to an NF accelerator 200 until the NF accelerator 200 needs to interact with external entities (not shown) in the data plane.

Runtime Phase Detector

Figure 7:
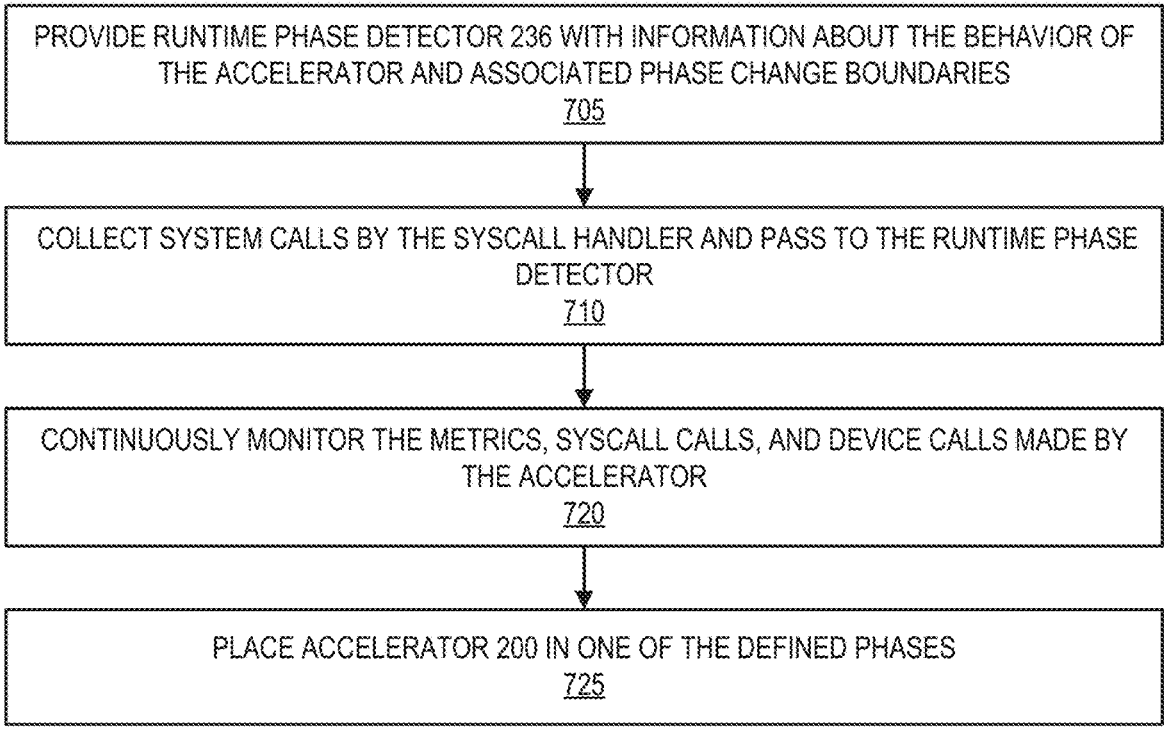
FIG. 7 is a flow chart illustrating one method for detecting a current operational phase of the NF accelerator by the runtime phase detector, consistent with some embodiments.

FIG. 7 is a flow chart illustrating one method 700 for detecting a current operational phase of the NF accelerator 200 by the runtime phase detector 236, consistent with some embodiments. Some embodiments may run the phase detector module as part of the kernel and utilize eBPF based probes for collecting information. The current application phase may be detected in the module based on side channel information collected from one or more sources, e.g., kernel scheduler, system call handler, runtime metric, and/or the device runtime info provided by the device driver.

At operation 705, at load time, the application loader may provide the runtime phase detector 236 with initial information about the behavior of the NF accelerator 200 and associated phase change boundaries, which it learned from offline phase detector 252. The NF accelerator 200, after it starts, may begin to make system calls. These system calls may be collected by the syscall handler and passed to the runtime phase detector 236 at operation 710. Additionally, the device commands issued by the NF accelerator 200 may be collected by the PF driver through the device runtime information collector module and passed to the runtime phase detector 236 at operation 715.

The runtime phase detector 236 may continuously monitor the various metrics, syscall calls, and device calls made by the NF accelerator 200 at operation 720 and, based on the information received from phase categorizer module, may place NF accelerator 200 in one of the defined phases at operation 725. In an alternate embodiment, the runtime phase detector 236 may also provide information about application syscalls and device calls back to the offline rules generator 256. These alternate embodiments may be desirable to provide continuous phase learning and/or to dynamically update the phases in response to patches, fixes, etc.

Dynamic Security Engine

Figure 8:
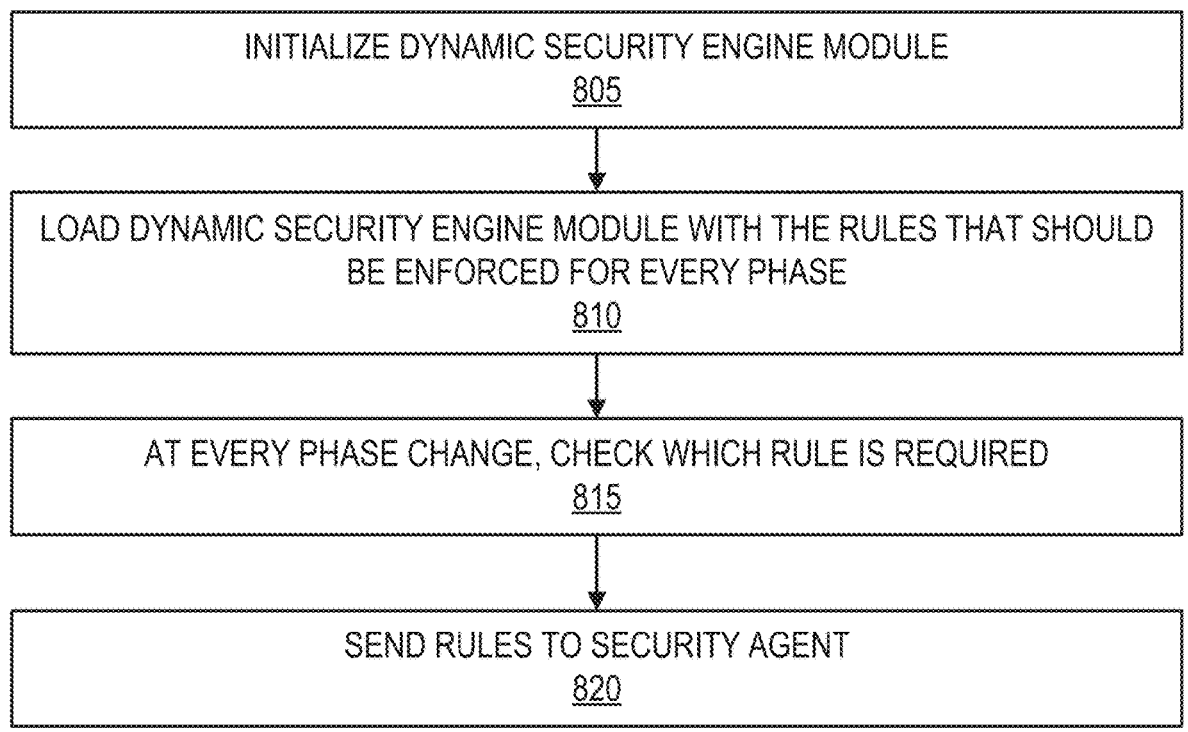
FIG. 8 is a flow chart illustrating one method for enforcing phase-based security restrictions on the NF accelerator by the dynamic security engine module, consistent with some embodiments.

FIG. 8 is a flow chart illustrating one method 800 for enforcing phase-based security restrictions on the NF accelerator 200 by the dynamic security engine module 234, consistent with some embodiments. At operation 805, the dynamic security engine module 234 module in the operating system by be initialized. Next, the dynamic security engine module 234 may be loaded with the rules it should enforce for every phase at operation 810. This operation 810 may be done substantially concurrently with initialization of the NF application 250. At every phase change, the module may check which rules are required at operation 815 and sends the rules to one of the two security agents (OS or device) at operation 820, which may enforce the rules. The rules may contain access information pertaining to allowed hardware, registers, mechanisms etc. For example, this rule:

{control_setup: [cpu:1,memory:50 MB,queues:Null, cache:Free,enc1:AES512,enc2:Null,in finiband0:Allow, REGS_DMA: Enabled, DATA_DMA: Disabled]} which instructs the security engine that in control path setup phase to:

allow 1 CPU with 50 MB Memory;
No Cache control, No Queues Setup;
Allow encryption coprocessor number 1 in AES512 mode;
Allow Infiniband circuit usage;
Allow DMA to device register space; and
Disable DMA to device data queues.

General

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method to protect accelerators from malicious network functions, comprising:
    analyzing an application runtime to automatically generate a plurality of phase-specific security restrictions by:
        initializing the application runtime in an offline environment;
        measuring a resource utilization by the application runtime at different time steps;
        recording system calls made by the application runtime at the different time steps; and
        using the measured resource utilization and the recorded system calls to identify a plurality of distinct operational phases for the application runtime; and
    enforcing one of the plurality of phase-specific security restrictions at one of the plurality of distinct operational phases.

2. The method of claim 1, wherein identifying one of the plurality of distinct operational phases comprises determining whether a cosine distance between is greater than a predetermined threshold.

3. The method of claim 1, wherein the analyzing further comprises using the measured resource utilization and the recorded system calls to calculate a signature for each of the plurality of distinct operational phases.

4. The method of claim 3, wherein enforcing the one of the plurality of phase-specific security restrictions at each of the plurality of distinct operational phases comprises:
    using the signatures to automatically detect a current operational phase for the application runtime.

5. The method of claim 1, wherein automatically generating the plurality of phase-specific security restrictions comprises:
    measuring resources consumed by the application runtime in the offline environment at each of the plurality of distinct operational phases for the application runtime;
    using the measured resources to build a model of the resources that the application runtime is allowed to access during each of the distinct operational phases; and
    generating a set of security restrictions for each of the distinct operational phases using the model.

6. The method of claim 1, wherein enforcing one of the plurality of phase-specific security restrictions comprises:
    automatically identifying a first of the plurality of distinct operational phases for the application runtime; and
    enforcing a first of the plurality of phase-specific security restrictions during the first of the plurality of distinct operational phases.

7. The method of claim 6, wherein enforcing one of the plurality of phase-specific security restrictions comprises:
    automatically identifying a second of the plurality of distinct operational phases for the application runtime; and
    selecting a second of the plurality of phase-specific security restrictions during the first of the plurality of distinct operational phases, wherein the first and the second of the plurality of phase-specific security restrictions are different.

8. The method of claim 1, wherein the measured resource utilization comprises CPU, memory, disk, network, and Power Management Controller (PMC).

9. A computer program product for protecting accelerators from malicious network functions, the computer program product comprising a non-transitory computer readable storage medium having program instructions embodied therewith, the program instructions executable by a processor to cause the processor to:
    analyzing an application runtime to automatically generate a plurality of phase-specific security restrictions, wherein the analyzing comprises:
    initializing the application runtime in an offline environment;
    at each of a plurality of time steps:
        measuring a resource utilization by the application runtime; and recording system calls made by the application runtime;
    using the measured resource utilization and the recorded system calls to:
        identify a plurality of distinct operational phases for the application runtime, wherein identifying one of the plurality of distinct operational phases comprises determining whether a cosine distance between is greater than a predetermined threshold; and
        calculate a signature for each of the plurality of distinct operational phases;
        build a model of the resources that the application runtime is allowed to access during each of the plurality of distinct operational phases; and generate a set of security restrictions for each of the plurality of distinct operational phases using the model;
    enforcing one of the plurality of phase-specific security restrictions at each of the plurality of distinct operational phases, wherein the enforcing comprises:
        using the signatures to automatically detect a first of the plurality of distinct operational phases for the application runtime; and enforcing a first of the plurality of phase-specific security restrictions during the first of the plurality of distinct operational phases;

using the signatures to automatically detect a second of the plurality of distinct operational phases for the application runtime; and selecting a second of the plurality of phase-specific security restrictions during the first of the plurality of distinct operational phases, wherein the first and the second of the plurality of phase-specific security restrictions are different.

10. A system for protecting accelerators from malicious network functions, comprising:
one or more processors; and
one or more non-transitory computer-readable storage media collectively storing instructions to cause the processor to perform a method comprising:
analyzing an application runtime to automatically generate a plurality of phase-specific security restrictions by:
initializing the application runtime in an offline environment;
measuring a resource utilization by the application runtime at different time steps;
recording system calls made by the application runtime at the different time steps; and
using the measured resource utilization and the recorded system calls to identify a plurality of distinct operational phases for the application runtime; and
enforcing one of the plurality of phase-specific security restrictions at one of the plurality of distinct operational phases.

11. The system of claim 10, wherein identifying a distinct operational phase comprises determining whether a cosine distance between is greater than a predetermined threshold.

12. The system of claim 10, wherein the analyzing further comprises using the measured resource utilization and the recorded system calls to calculate a signature for each of the plurality of distinct operational phases.

13. The system of claim 12, wherein enforcing the one of the plurality of phase-specific security restrictions at each of the plurality of distinct operational phases comprises:

using the signatures to automatically detect a current operational phase for the application runtime.

14. The system of claim 11, wherein automatically generating the plurality of phase-specific security restrictions comprises:
measuring resources consumed by the application runtime in the offline environment at each of the plurality of distinct operational phases for the application runtime;
using the measured resources to build a model of the resources that the application runtime is allowed to access during each of the distinct operational phases; and
generating a set of security restrictions for each of the distinct operational phases using the model.

15. The system of claim 10, wherein enforcing one of the plurality of phase-specific security restrictions comprises:
automatically identifying a first of the plurality of distinct operational phases for the application runtime; and
enforcing a first of the plurality of phase-specific security restrictions during the first of the plurality of distinct operational phases.

16. The system of claim 15, wherein enforcing one of the plurality of phase-specific security restrictions comprises:
automatically identifying a second of the plurality of distinct operational phases for the application runtime; and
selecting a second of the plurality of phase-specific security restrictions during the first of the plurality of distinct operational phases, wherein the first and the second of the plurality of phase-specific security restrictions are different.

17. The system of claim 16, wherein the application runtime is executed on an accelerator, wherein the accelerator comprises a SmartNIC, the SmartNIC including an offloaded application.

18. The system of claim 10, wherein the measured resource utilization comprises CPU, memory, disk, network, and Power Management Controller (PMC).

* * * * *